(12) United States Patent
Rajagopalan et al.

(10) Patent No.: US 8,798,251 B2
(45) Date of Patent: Aug. 5, 2014

(54) METHODS AND SYSTEMS FOR COMPUTER ENHANCED CONFERENCE CALLING

(75) Inventors: Mahesh Rajagopalan, Irving, TX (US); Brian F. Roberts, Lewisville, TX (US); Nagendra Kunuturi, Irving, TX (US); Ramkumar K. Mambakkam, Irving, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1388 days.

(21) Appl. No.: 10/721,009

(22) Filed: Nov. 24, 2003

(65) Prior Publication Data

US 2004/0208303 A1 Oct. 21, 2004

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(51) Int. Cl.
*H04M 3/42* (2006.01)
*H04M 3/54* (2006.01)
*H04M 3/56* (2006.01)

(52) U.S. Cl.
CPC ........ *H04M 3/54* (2013.01); *H04M 2203/2072* (2013.01); *H04M 3/56* (2013.01)
USPC ................................ 379/202.01; 379/201.01

(58) Field of Classification Search
CPC .................................. H04M 3/56; H04M 3/54
USPC ........... 379/202.01, 211.02, 201.01; 709/204, 709/205; 370/260; 345/751
See application file for complete search history.

(56) References Cited

U.S. PATENT DOCUMENTS 4,013,839 A 3/1977 Bell
4,540,850 A 9/1985 Herr et al.

(Continued)

FOREIGN PATENT DOCUMENTS

CA 2240878 12/1998
DE 10110942 9/2002

(Continued)

OTHER PUBLICATIONS

"MP3 Recorder Download—MP3 Recorder—Record Audio Stream to MP3 or WAV," 2002, http://www.mp3-recorder-net.

(Continued)

*Primary Examiner* — Sonia Gay

(57) ABSTRACT

Methods and systems for establishing a computer-enhanced conference call are disclosed. Methods and systems consistent with the present invention establish a computer-enhanced conference call between a plurality of users, including an initiating user. A service center detects a computer-enhanced conference call event that was previously configured by the initiating user. Conference users associated with the computer-enhanced conference call event are thereafter contacted. After at least one response from the conference users is received, a conference call between the initiating user and the conference users is established based on the at least one received response. The service center also establishes a collaboration between the initiating user and conference users that are authorized to participate in the collaboration.

63 Claims, 7 Drawing Sheets

(56) References Cited

U.S. PATENT DOCUMENTS

| | | | |
|---|---|---|---|
| 4,600,814 A | 7/1986 | Cunniff et al. | |
| 4,924,496 A | 5/1990 | Figa et al. | |
| 5,014,303 A | 5/1991 | Velius | |
| 5,113,431 A | 5/1992 | Horn | |
| 5,168,515 A | 12/1992 | Gechter et al. | |
| 5,222,125 A | 6/1993 | Creswell et al. | |
| 5,274,700 A | 12/1993 | Gechter et al. | |
| 5,327,486 A | 7/1994 | Wolff et al. | |
| 5,329,578 A | 7/1994 | Brennen et al. | |
| 5,428,663 A | 6/1995 | Grimes et al. | |
| 5,440,624 A | 8/1995 | Schoof | |
| 5,483,586 A | 1/1996 | Sussman | |
| 5,533,096 A | 7/1996 | Bales | |
| 5,535,265 A | 7/1996 | Suwandhaputra | |
| 5,546,449 A | 8/1996 | Hogan et al. | |
| 5,548,636 A * | 8/1996 | Bannister et al. | 379/390.01 |
| 5,550,907 A * | 8/1996 | Carlsen | 379/211.02 |
| 5,583,564 A | 12/1996 | Rao et al. | |
| 5,586,173 A | 12/1996 | Misholi et al. | |
| 5,588,037 A | 12/1996 | Fuller et al. | |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | |
| 5,638,434 A | 6/1997 | Gottlieb et al. | |
| 5,649,105 A | 7/1997 | Aldred et al. | |
| 5,652,789 A | 7/1997 | Miner et al. | |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,712,903 A | 1/1998 | Bartholomew et al. | |
| 5,715,444 A | 2/1998 | Danish et al. | |
| 5,717,863 A * | 2/1998 | Adamson et al. | 709/204 |
| 5,719,925 A | 2/1998 | Peoples | |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,745,884 A | 4/1998 | Carnegie et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | |
| 5,875,437 A | 2/1999 | Atkins | |
| 5,892,900 A | 4/1999 | Ginter et al. | |
| 5,903,845 A | 5/1999 | Buhrmann et al. | |
| 5,907,324 A | 5/1999 | Larson et al. | |
| 5,907,547 A | 5/1999 | Foladare et al. | |
| 5,910,987 A | 6/1999 | Ginter et al. | |
| 5,916,302 A | 6/1999 | Dunn et al. | |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,011,579 A | 1/2000 | Newlin | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,078,658 A | 6/2000 | Yunoki | |
| 6,088,435 A | 7/2000 | Barber et al. | |
| 6,092,102 A | 7/2000 | Wagner | |
| 6,100,882 A | 8/2000 | Sharman et al. | |
| 6,122,348 A | 9/2000 | French-St George et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,145,096 A | 11/2000 | Bereiter et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | |
| 6,195,660 B1 | 2/2001 | Polnerow et al. | |
| 6,215,863 B1 | 4/2001 | Bennett et al. | |
| 6,219,413 B1 | 4/2001 | Burg | |
| 6,226,374 B1 | 5/2001 | Howell et al. | |
| 6,240,449 B1 | 5/2001 | Nadeau | |
| 6,243,366 B1 | 6/2001 | Bradley et al. | |
| 6,260,050 B1 | 7/2001 | Yost et al. | |
| 6,275,575 B1 * | 8/2001 | Wu | 379/202.01 |
| 6,282,522 B1 | 8/2001 | Davis et al. | |
| 6,298,062 B1 | 10/2001 | Gardell et al. | |
| 6,301,338 B1 | 10/2001 | Makela et al. | |
| 6,301,609 B1 | 10/2001 | Aravamudan et al. | |
| 6,310,939 B1 | 10/2001 | Varney | |
| 6,310,947 B1 | 10/2001 | Polcyn | |
| 6,324,269 B1 | 11/2001 | Malik | |
| 6,330,321 B2 | 12/2001 | Detampel et al. | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,404,873 B1 | 6/2002 | Beyda et al. | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 * | 8/2002 | Liffick | 370/352 |
| 6,434,226 B1 | 8/2002 | takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | |
| 6,459,913 B2 | 10/2002 | Cloutier | |
| 6,463,145 B1 | 10/2002 | O'Neal et al. | |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | |
| 6,546,262 B1 | 4/2003 | Freadman | |
| 6,547,830 B1 | 4/2003 | Mercer | |

(56) References Cited

U.S. PATENT DOCUMENTS

| | | | |
|---|---|---|---|
| 6,560,329 B1 | 5/2003 | Draginich et al. |
| 6,563,914 B2 | 5/2003 | Sammon et al. |
| 6,564,261 B1 | 5/2003 | Gudjonsson et al. |
| 6,574,324 B1 | 6/2003 | Malik |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 | 6/2003 | Matthews et al. |
| 6,587,890 B1 | 7/2003 | Kult et al. |
| 6,590,603 B2 | 7/2003 | Sheldon et al. |
| 6,590,969 B1 | 7/2003 | Peters et al. |
| 6,593,352 B2 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary |
| 6,611,590 B1 | 8/2003 | Lu et al. |
| 6,614,786 B1 | 9/2003 | Byers |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,694,351 B1 | 2/2004 | Shaffer et al. |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,754,227 B1 | 6/2004 | Petersen et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,772,436 B1 | 8/2004 | Doganata et al. |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 * | 9/2004 | Doganata et al. ............. 370/260 |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,839,417 B2 | 1/2005 | Weisman et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,870,916 B2 | 3/2005 | Henrikson et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,937,713 B1 | 8/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,988,132 B2 | 1/2006 | Horvitz |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,050,558 B1 | 5/2006 | Pershan et al. |
| 7,065,198 B2 | 6/2006 | Brown et al. |
| 7,068,768 B2 | 6/2006 | Barnes |
| 7,069,298 B2 | 6/2006 | Zhu et al. |
| 7,076,528 B2 | 7/2006 | Premutico |
| 7,099,288 B1 * | 8/2006 | Parker et al. ................. 370/259 |
| 7,102,643 B2 | 9/2006 | Moore et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,167,552 B1 | 1/2007 | Shaffer et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,353,258 B2 | 4/2008 | Washburn |
| 7,379,538 B1 | 5/2008 | Ali et al. |
| 7,418,090 B2 | 8/2008 | Reding et al. |
| 7,420,935 B2 | 9/2008 | Virolainen |
| 7,428,580 B2 | 9/2008 | Hullfish et al. |
| 7,546,337 B1 | 6/2009 | Crawford |
| 7,561,872 B1 | 7/2009 | Koch et al. |
| 7,606,909 B1 | 10/2009 | Ely et al. |
| 7,616,747 B1 | 11/2009 | Wurster et al. |
| 7,912,193 B2 | 3/2011 | Chingon et al. |
| 8,166,173 B2 | 4/2012 | Low et al. |
| 8,238,380 B2 | 8/2012 | D'Angelo |
| 8,271,591 B2 | 9/2012 | Malik et al. |
| 8,467,502 B2 | 6/2013 | Sureka et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |

(56) References Cited

U.S. PATENT DOCUMENTS

| | | |
|---|---|---|
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1* | 6/2002 | Thompson et al. ............ 345/751 |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1* | 6/2002 | Chung et al. ................. 709/204 |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0082997 A1 | 6/2002 | Kobata et al. |
| 2002/0083462 A1 | 6/2002 | Arnott |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1* | 8/2002 | Rodman et al. ............... 709/204 |
| 2002/0103898 A1 | 8/2002 | Moyer et al. |
| 2002/0110121 A1 | 8/2002 | Mishra |
| 2002/0115471 A1 | 8/2002 | DeLoye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1* | 10/2002 | McIntyre ................. 379/211.02 |
| 2002/0147777 A1 | 10/2002 | Hackbarth et al. |
| 2002/0147811 A1 | 10/2002 | Schwartz et al. |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1* | 1/2003 | Thompson et al. ............ 709/238 |
| 2003/0014488 A1* | 1/2003 | Dalal et al. .................... 709/204 |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0063732 A1* | 4/2003 | Mcknight ................. 379/210.01 |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1* | 11/2003 | Musa ............................ 709/205 |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081295 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0128409 A1 | 6/2006 | Gress et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| EP | 0818908 | 1/1998 |
| EP | 0818908 A3 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 4/2002 |
| EP | 1 235 387 | 8/2002 |
| EP | 1294201 | 3/2003 |
| JP | 59-169264 | 9/1984 |
| JP | 02-260750 | 10/1990 |
| JP | 4-336742 | 11/1992 |
| JP | 05-316233 | 11/1993 |
| JP | 06-113020 | 4/1994 |
| JP | 07-030664 | 1/1995 |
| JP | 07-058856 | 3/1995 |
| JP | 7-107171 | 4/1995 |
| JP | 07-107549 | 4/1995 |
| JP | 07-123098 | 5/1995 |
| JP | 08-149226 | 7/1996 |
| JP | 08-181763 | 7/1996 |
| JP | 8-298546 | 11/1996 |

(56) References Cited

FOREIGN PATENT DOCUMENTS

| | | |
|---|---|---|
| JP | 08-331642 | 12/1996 |
| JP | 09-064869 | 3/1997 |
| JP | 09-064977 | 3/1997 |
| JP | 09-083651 | 3/1997 |
| JP | 9-200350 | 7/1997 |
| JP | 09-223087 | 8/1997 |
| JP | 09-261759 | 10/1997 |
| JP | 09-294158 | 11/1997 |
| JP | 9-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000224301 | 8/2000 |
| JP | 20002047807 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-44257 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | WO 96/14704 | 5/1996 |
| WO | WO-97/20423 | 6/1997 |
| WO | WO-97/33421 | 9/1997 |
| WO | WO-98/02007 | 1/1998 |
| WO | 99/22493 | 5/1999 |
| WO | 99/38309 | 7/1999 |
| WO | WO-00/45557 | 8/2000 |
| WO | 0064133 | 10/2000 |
| WO | WO-00/60837 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | 0152513 | 7/2001 |
| WO | WO 01/89212 | 11/2001 |
| WO | WO-02/25907 | 3/2002 |
| WO | WO-02/43338 | 5/2002 |

OTHER PUBLICATIONS

"FAQ Premium Home Answer" eVoice, http://content.evoice.com/wcs/signUp/FAQ_premHA s01.htm.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.
"The Mobile Phone User Guide", http://www.mobileshop.org/usertech/wildfire.htm, printed Oct. 1, 2004.
Kornowski, J., "Wildfire at Your Back and Call-A Voice-Activated Telephone Assistant That Minds You and Your Messages", http://www.lacba.org/lalawyer/techwildfire.html, pronted Oct. 1, 2004.
Cisco Personal Assistant 1.4, Cisco Systems, Jun. 24, 2003, http://www.cisco.com/en/US/products/sw/voicesw/ps2026/prod_presentation_list.html, printed Oct. 1, 2004.
U.S. Appl. No. 09/828,679, filed Apr. 6, 2001, Reding et al.
U.S. Appl. No. 09/785,223, filed Feb. 16, 2001, Swingle et al.
"MP3 Recorder Download—MP3 Recorder—Record Audio Stream to MP3 or WAV," 2002 http://www.mp3-recorder.net.
"FAQ Premium Home Answer" eVoice, http://content.evoice.com/wcs/signUp/FAQ_premHA_s01.htm.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProoressReports2002/Progress%20Reports2002/53SupplementalReport(Oct. 20, 2002).htm.
"How Internet Radio Works," Howstuffworks, http://computerhowstuffworks.com/internet-radio.htm/printable.
"NetMeeting102," http://www.meetingbvwire.com/NetMeeting102.htm.
Business Solutions/Professional, http://www.accessline.com/business_sol/bs_professional body.html.
"A Model for Presence and Instant Messaging", M. Day, et al. Fujitsu, Feb. 2000, Network Working Group, Request for Comments 2778.
"Calendar Scheduling Teleconference Communication Mechanism," IBM Technical Disclosure Bulletin, IBM Corp. New York, US, vol. 37, No. 3, Mar. 1, 1994, p. 561.
White, "How Computers Work," Millenium Edition, Sep. 1999, Que Corporation, pp. vi-xi, 135-184, 399-421.
Derfler et al., "How Networks Work," Bestseller Edition, 1996, Ziff-Davis Press, pp. vi-ix, 1-3, 21-70, 190-198.
Gralla, "How the Internet Works," Ziff-Davis Press, 1999, pp. vi-xi, 2-3, 8-11, 308-324.

(56) References Cited

OTHER PUBLICATIONS

Muller, "Desktop Encyclopedia of the Internet," Artech House Inc., 1999, pp. v-xiv, 233-246, 539-559.
http://replay.waybackmachine.org/20020207142936/http://www.clicktocall.com/main.htm, Internet archive of website "www,clicktocall.com", dated Feb. 7, 2002.
Gaedke, et al., "Web Content Delivery to Heterogeneous Mobile Platforms", Advances in Database Technologies, Lecture Notes in Computer Science (LNCS), vol. 1552, Springer Verlag, Nov. 16-19, 1998.
Gessler et al., "PDAs as Mobile WWW browsers", Computer Networks and ISDN Systems, vol. 28, Issue 1-2, 10 pages, Dec. 1995.
Kunz et al., "An Architecture for Adaptive Mobile Applications", pp. 1-12, May 13, 1999.
Lauff, at al., "Multimedia Client Implementation on Personal Digital Assistants", pp. 1-13, Sep. 10-12, 1997.
"Accessline Comms' Accessline Service, The One-Number Wonder," CommWeb, T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, htto://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.
Data Connection, "Integrating Voicemail Systems, A white paper describing the integration of heterogeneous voicemail systems," Michael James, Internet Applications Group, Data Connection Ltd., 2004.
Data Connection, Strategic Computer Technology, "MailNGen: Next generation messaging for Service Providers," Data Connection Ltd, 1998-2004, http://www.dataconnection.com/messaging/.
Data Connection, Strategic Computer Technology, "MailNGen: Unified Messaging," Data Connection Ltd, 1998-2004, htto://www.dataconnection.com/messaging/unified_messaging.htm.
Data Connection, Strategic Computer Technology, "MeetingServer: The award-winning web conferencing solution for Service Providers," Data Connection Ltd, 1998-2005, http://www.dataconnection.com/conferencing/.
Data Connection, Strategic Computer Technology, "MeetingServer: The web conferencing solution for Service Providers," Data Connection Ltd, 1998-2004, http://www.dataconnection.com/conferencing/meetingserver.htm.
Data Connection, Strategic Computer Technology, "MeetingServer: Web conferencing architecture," Data Connection Ltd, 1998-2004, http://www.dataconnection.com/conferencing/meetingserver_arch.htm.
"Audio Digitizing Process", "Audio Digitizing Process," TalkBank, http://www.talkbank.org/da/audiodig.html, six pages, retrieved from the internet on Oct. 15, 2003.
"Business Solutions/Professional", "Business Solutions/Professional," http://www.accessline.com/business_sol/bs_professional_body.html, two pages, retrieved from the internet on Apr. 17, 2003.
"FAQ—Premium Home Answer", "FAQ Premium Home Answer," eVoice, http://content.evoice.com/wcs/signUp/FAQ_premHA_s01.htm, three pages, retrieved from the internet on Jul. 2, 2001.
"How Internet Radio Works", "How Internet Radio Works," Howstuffworks, http://computer.howstuffworks.com/internet-radio.htm/printable, five pages, retrieved from the internet on Oct. 16, 2003.
"Instructions on Application Sharing and Data Collaboration", "Instructions on Application Sharing and Data Collaboration," VCON Escort and Cruiser, http://www.vide.gatech.edu/docs/share/, 10 pages, retrieved from the internet on Oct. 6, 2003.
"Instructions on Multipoint Application Sharing and Data Collaboration", Instructions on Multipoint Application Sharing and Data Collaboration, VCON Escort and Cruiser with the RadVision MCU, http://www.vide.gatech.edu/docs/multi-share, six pages, retrieved from the internet on Oct. 6, 2003.
"Macromedia SoundEdit 16 Support Center-Working with Other Programs, What is Shockwave Audio Streaming?", "Macromedia SoundEdit 16 Support Center-Working with Other Programs, What is

(56) References Cited

OTHER PUBLICATIONS

Shockwave Audio Streaming?" http://www.macromedia.com/support/soundedit/how/shock/whatis.html, two pages, retrieved from the internet on Oct. 24, 2003.

"NetMeeting101", "NetMeeting101," Meeting by Wire, http://www.meetingbywire.com/NetMeeting101.htm, nine pages, retrieved from the internet on Oct. 6, 2003.

"NetMeeting102", "NetMeeting102," Meeting by Wire, http://www.meetingbywire.com/NetMeeting102.htm, 11pages, retrieved from the internet on Oct. 6, 2003.

Chou, "Inside SSL: The Secure Sockets Layer Protocol", Chou, "Inside SSL: The Secure Sockets Layer Protocol," IT Professional, vol. 4, Issue 4, pp. 47-52, Jul./Aug. 2002.

Odenwald, "Real-Time Collaboration Integration in the Portal", Odenwald, "Real-Time Collaboration Integration in the Portal," SAP Design Guild, http://www.sapdesignguild.org/editions/edition5/synch_collab.asp, 10 pages, retrieved from the internet on Oct. 6, 2003.

Wagner, et al., "Analysis of the SSL 3.0 Protocol", Wagner, et al., "Analysis of the SSL 3.0 Protocol," Proceedings of the 2nd Conference on Proceedings of the Second USENIX Workshop on Electronic Commerce (WOEC'96 ), vol. 2, 12 pages, Nov. 1996.

* cited by examiner

METHODS AND SYSTEMS FOR COMPUTER ENHANCED CONFERENCE CALLING

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002 now U.S. Pat. No. 7,142,646; U.S. patent application Ser. No. 10/083,884, entitled "DEVICE INDEPENDENT CALLER ID," filed Feb. 27, 2002 now U.S. Pat. No. 7,190,773; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122 filed Feb.27, 2001, 60/272,167 filed Feb. 27, 2001, 60/275,667 filed Mar. 13, 2001, 60/275,719 filed Mar. 13, 2001, 60/275,020 filed Mar. 13, 2001, 60/275,031 filed Mar. 13, 2001, and 60/276,505 filed Mar. 19,2001, and all of which are expressly incorporated herein by reference in their entirety.

Applicants also claim the right to priority under 35 U.S.C. §119(e) based on Provisional Patent Application No. 60/428,704, entitled "DIGITAL COMPANION,"filed Nov. 25, 2002; and Provisional Patent Application No. 60/436,018, entitled "DIGITAL COMPANION, " filed Dec. 26, 2002, both of which are expressly incorporated herein by reference in their entirety.

The present application also relates to U.S. patent application Ser. No.10/084,121, entitled "CALENDAR-BASED CALLING AGENTS," filed Feb. 27, 2002; U.S. patent application Ser. No. 10/720,661, entitled "METHODS AND SYSTEMS FOR CONFIGURING AND PROVIDING CONFERENCE CALLS,"; U.S. patent application Ser. No. 10/720,859, entitled "METHODS AND SYSTEMS FOR CONFERENCE CALL BUFFERING,"; U.S. patent application Ser. No. 10/720,943, entitled "METHODS AND SYSTEMS FOR REMOTE CALL ESTABLISHMENT,"; U.S. patent application Ser. No. 10/721,005, entitled "METHODS AND SYSTEMS FOR CALL MANAGEMENT WITH USER INTERVENTION,"; U.S. patent application Ser. No. 10/720,868, entitled "METHODS AND SYSTEMS FOR DIRECTORY INFORMATION LOOKUP,"; U.S. patent application Ser. No. 10/720,970,entitled "METHODS AND SYSTEMS FOR AUTOMATIC COMMUNICATION LINE MANAGEMENT BASED ON DEVICE LOCATION,"; U.S. patent application Ser. No. 10/720,952, entitled "METHODS AND APPARATUS FOR ADAPTIVE MESSAGE AND CALL NOTIFICATION,"; U.S. patent application Ser. No. 10/720,870, entitled "METHODS AND SYSTEMS FOR A CALL LOG,"; U.S. patent application Ser. No. 10/720,633, entitled "METHODS AND SYSTEMS FOR AUTOMATIC FORWARDING OF CALLS TO A PREFERRED DEVICE,"; U.S. patent application Ser. No. 10/720,971, entitled "METHODS AND SYSTEMS FOR LINE MANAGEMENT,"; U.S. patent application Ser. No. 10/720,784, entitled "METHODS AND SYSTEMS FOR CONTACT MANAGEMENT,"; U.S. patent application Ser. No. 10/720,920, entitled "METHODS AND SYSTEMS FOR NOTIFICATION OF CALL TO DEVICE,"; U.S. patent application Ser. No. 10/720,825, entitled "METHODS AND SYSTEMS FOR SINGLE NUMBER TEXT MESSAGING,"; U.S. patent application Ser. No. 10/720,944, entitled "METHODS AND SYSTEMS FOR MULTIUSER SELECTIVE NOTIFICATION,"; U.S. patent application Ser. No. 10/720,933, entitled "METHODS AND SYSTEMS FOR CPN TRIGGERED COLLABORATION,"; and U.S. patent application Ser. No. 10/720,938, entitled "METHODS AND SYSTEMS FOR PREEMPTIVE REJECTION OF CALLS," all of which are expressly incorporated herein by reference in their entirety.

TECHNICAL FIELD

The present invention relates generally to data processing systems and, more particularly, to a method and system for computer enhanced conference calling.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat a phone call differently dependent on who is calling the user. For example, if a user receives a call from a caller that the user does not want to speak to at the moment, the user may want to send that call directly to voice mail. Also, if a user receives a call from a number that displays no caller ID information or that the user otherwise does not recognize, the user may wish to somehow specially treat the call because the caller is a potential telemarketer.

Further relating to communication between users, a wide variety of means also exist for establishing a conference call between three or more users. For example, one method for establishing a conference call involves having one user call other users (e.g., conference users) and bridging each user onto the conference call. This method requires that the initiating user individually call each conference user.

Another method for establishing a conference call involves using a telephone number that conference users call in order to join the conference call. This method requires that each participant know of the conference call beforehand and requires that a dial-number and access code be assigned to the conference call beforehand.

Yet another method for establishing a conference call involves establishing a predetermined list of conference users and initiating a conference call to the list of participants at the request of an initiating user. The voice network bridges calls to the conference users to establish the conference call.

Current conference call methods, however, do not enable an initiating user to enhance a conference call by selectively allowing conference users to join a data collaboration in addition to the conference call.

SUMMARY OF THE INVENTION

Methods and systems consistent with the principles of the invention establish a computer-enhanced conference call between a plurality of users. A service center detects a computer-enhanced conference call event that was previously configured by an initiating user. Conference users associated with the computer-enhanced conference call event are thereafter contacted. After at least one response from the conference users is received, a conference call between the initiating user and the conference users is established based on the at least one received response. The service center also establishes a collaboration between the initiating user and conference users that are authorized to participate in the collaboration.

Other methods and systems consistent with the principles of the invention also establish a computer-enhanced conference call between a plurality of users. A service center detects a computer-enhanced conference call event that was previously configured by an initiating user. Conference users associated with the computer-enhanced conference call event are thereafter contacted. After at least one response from the conference users is received, a conference bridge may bridge calls to devices of the initiating user and the conference users based on the at least one received response, wherein at least one of the calls is forwarded to a preferred device of one of the conference users. The service center also establishes a collaboration between the initiating user and conference users that are authorized to participate in the collaboration.

Other methods and systems consistent with the principles of the invention establish a computer-enhanced conference call. A service center receives information pertaining to a computer-enhanced conference call between a plurality of conference users, including an initiating user, that was setup by the initiating user. The service center also sends a notification of a computer-enhanced conference call request to a device associated with one of the plurality of conference users and receives a response to the notification. Thereafter, a conference call between the initiating user and the conference users and a collaboration between the initiating user and conference users that are authorized to participate in the collaboration are established based on the response.

Other methods and systems consistent with the principles of the invention participate in a computer-enhanced conference call automatically established by at least one or more communication entity. For example, a method consistent with principles of the invention may comprise: scheduling a computer-enhanced conference call at a predetermined time using a calendar application, wherein scheduling includes identifying conference users that are to participate in the computer-enhanced conference call and identifying conference users that are authorized to participate in a collaboration corresponding to the computer-enhanced conference call; and at the predetermined time: receiving an indication that a computer-enhanced conference call has been configured in accordance with the scheduled computer-enhanced conference call, and receiving an indication that at least one conference user has either joined or declined to join the computer-enhanced conference call.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention establish a computer-enhanced conference call between a plurality of users. A service center detects a computer-enhanced conference call event that was previously configured by an initiating user. Conference users associated with the computer-enhanced conference call event are thereafter contacted at a specific time and/or date specified by the initiating user. After at least one response from the conference users is received, a conference bridge may bridge calls to devices of the initiating user and the conference users based on the at least one received response, wherein at least one of the calls is forwarded to a preferred device of one of the conference users. The service center also establishes a collaboration between the initiating user and conference users that are authorized to participate in the collaboration. The initiating user may decide which conference users are authorized to participate in the collaboration and make appropriate denotations when setting up the computer-enhanced conference call.

In this manner, users may participate in a computer-enhanced conference call, which is a conference call between multiple users, accompanied by a collaboration between some or all of those users. The collaboration may enable multiple users (e.g., participants) to share data interactively.

Network Environment

Figure 1:
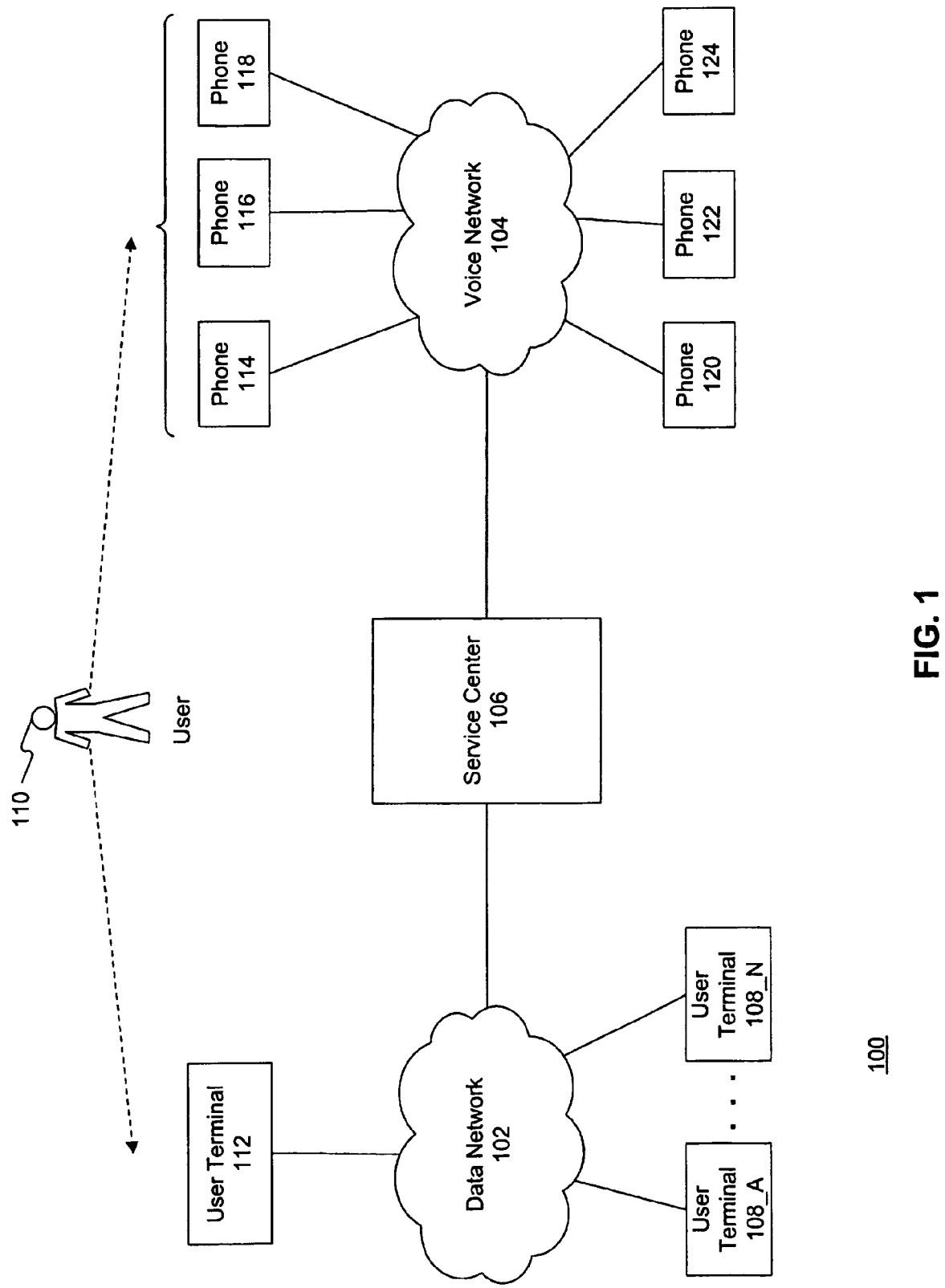
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Other users (not shown) may use user terminals 108 and phones, such as phones 120, 122, or 124, in a manner similar to the use of user terminal 112 and phones 114, 116, and 118 by user 110.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, service center 106 may be connected to multiple data networks 102, such as, for example, to a wireless carrier network and to the Internet.

Voice network 104 may provide telephony services to users. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing 2-way video communications. In another example, the voice network may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's ™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

User terminals 108a-108n may provide functions to other users similar to those provided by user terminal 112 to user 110. One of ordinary skill in the art will appreciate that user terminals 108a-108n may be implemented using devices similar to those used to implement user terminal 112.

Phones 114, 116, 118, 120, 122, and 124 interface with voice network 104. Phones 114, 116, 118,120,122, and 124 may be implemented using known devices, including wireline phones and mobile phones. Although phones 114, 116, 118,120, 122, and 124 are shown directly connected to voice network 104, any number of intervening elements, such as a private branch exchange ("PBX"), may be interposed between phones 114, 116, 118, 120,122, and 124, and voice network 104.

Figure 2:
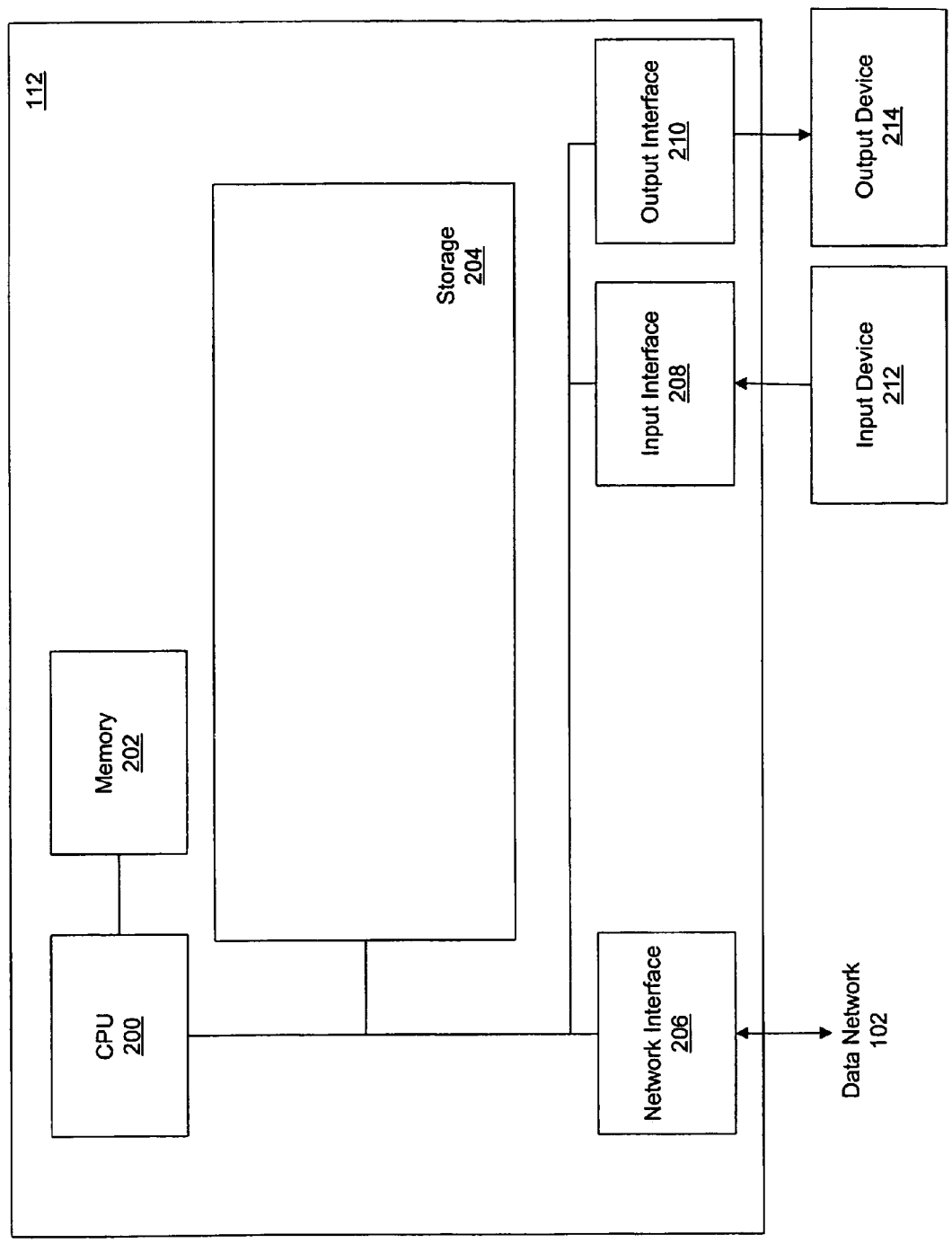
FIG. 2 is a diagram of an exemplary user terminal, consistent with the principals of the present invention.

FIG. 2 is a block diagram of a user terminal consistent with the present invention. User terminal 112 may include a central processing unit (CPU) 200, a memory 202, a storage module 204, a network interface 206, an input interface 208, an output interface 210, an input device 216, and an output device 218. One of ordinary skill in the art will appreciate that user terminals 108a-108n may include components similar to those shown for user terminal 112.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
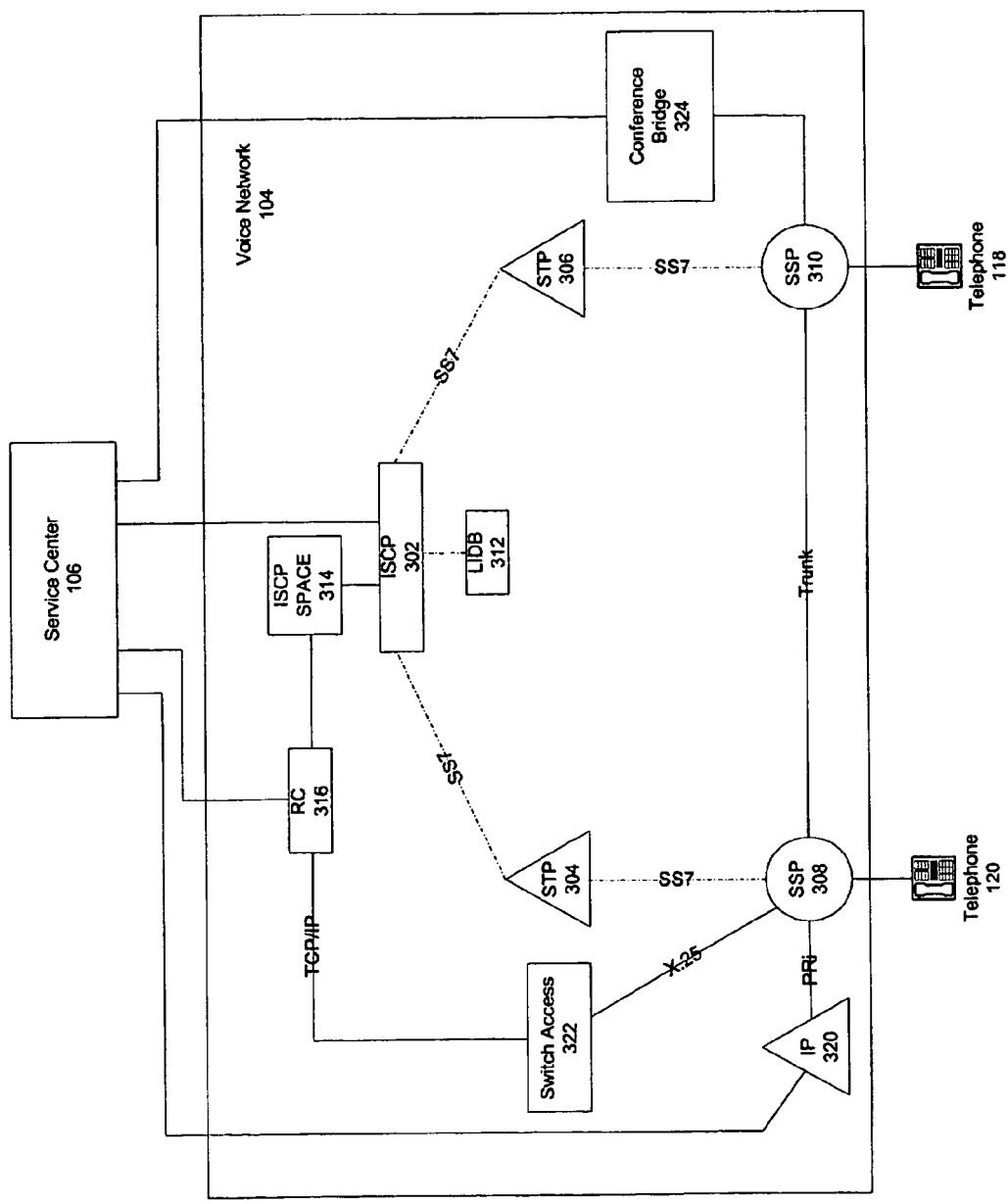
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, an Intelligent Peripheral (IP) 320, a switch access 322, and a conference bridge 324. Although this embodiment voice network 104 is described as a PSTN, as discussed above in other embodiments, the voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GDI) for TCP/IP.

STPs 304 and 306 relay SS7 messages within voice network 104. For example, STP 304 may route SS7 messages between SSPs 308 and 310. STP 304 or 306 may be implemented using known hardware and software from manufacturers such as NORTEL™ and LUCENT Technologies™.

SSPs 308 and 310 provide an interface between voice network 104 and phones 120 and 118, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between a calling party and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to the ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (MIS); or a multi-services platform (MSP). As an example, the eRC and MIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an MIS is used for providing updates to the ISCPs 302.

Updates sent to SSPs 308 or 310 may be sent from recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. Switch access 322 may be implemented using hardware and/or software. These connections may include any number of elements, such as, for example, switches, routers, hubs, etc. and may be, for example, an internal data network for voice network 104.

Voice network 104 may also include one or more intelligent peripherals (IP). For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between the SSP 308 and IP 320 may use the Primary Rate interface (PRi) (e.g., the 1129 protocol) protocol. Additionally, IP 320 may be capable of sending and receiving information to/from the Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for the voice network 104.

Additionally, voice network 104 may include one or more conference bridges 324. Conference bridge 324 may be operable to host a conference call between users, or host multiple simultaneous conference calls between users. For example, conference bridge 324 may receive commands to call various users (e.g., conference users) at specific phones (e.g., telephones 118 or 120, or any other phone connected to voice network 104. The calls to users may be made at a predetermined time. Upon establishing contact with a user, conference bridge 324 enables that user to participate in a conference call with other users. In one embodiment, conference bridge 324 may be implemented using a commercially available conference bridge such as those manufactured by Voyant Technologies, Cisco, Nortel Networks, etc. Further, although FIG. 3 illustrates conference bridge 324 as being directly connected to service center 106 and SSP 310, these connections may include any number of elements including routers, switches, hubs, etc., and may be via, for example, an internal data network for the voice network 104.

Figure 4:
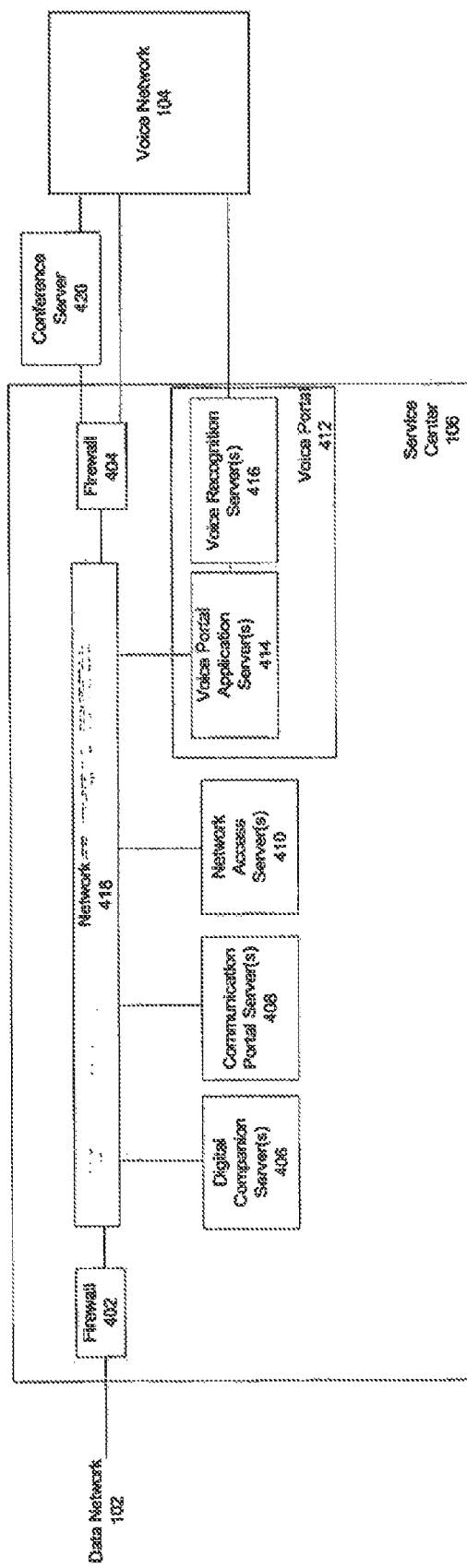
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, conference server 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in the network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, digital companion server 406 may provide the software and hardware for providing specific services of the service center to a customer, that is, a user that subscribes to various services of service center 106. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, setting up computer-enhanced conference calls, etc.

Communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
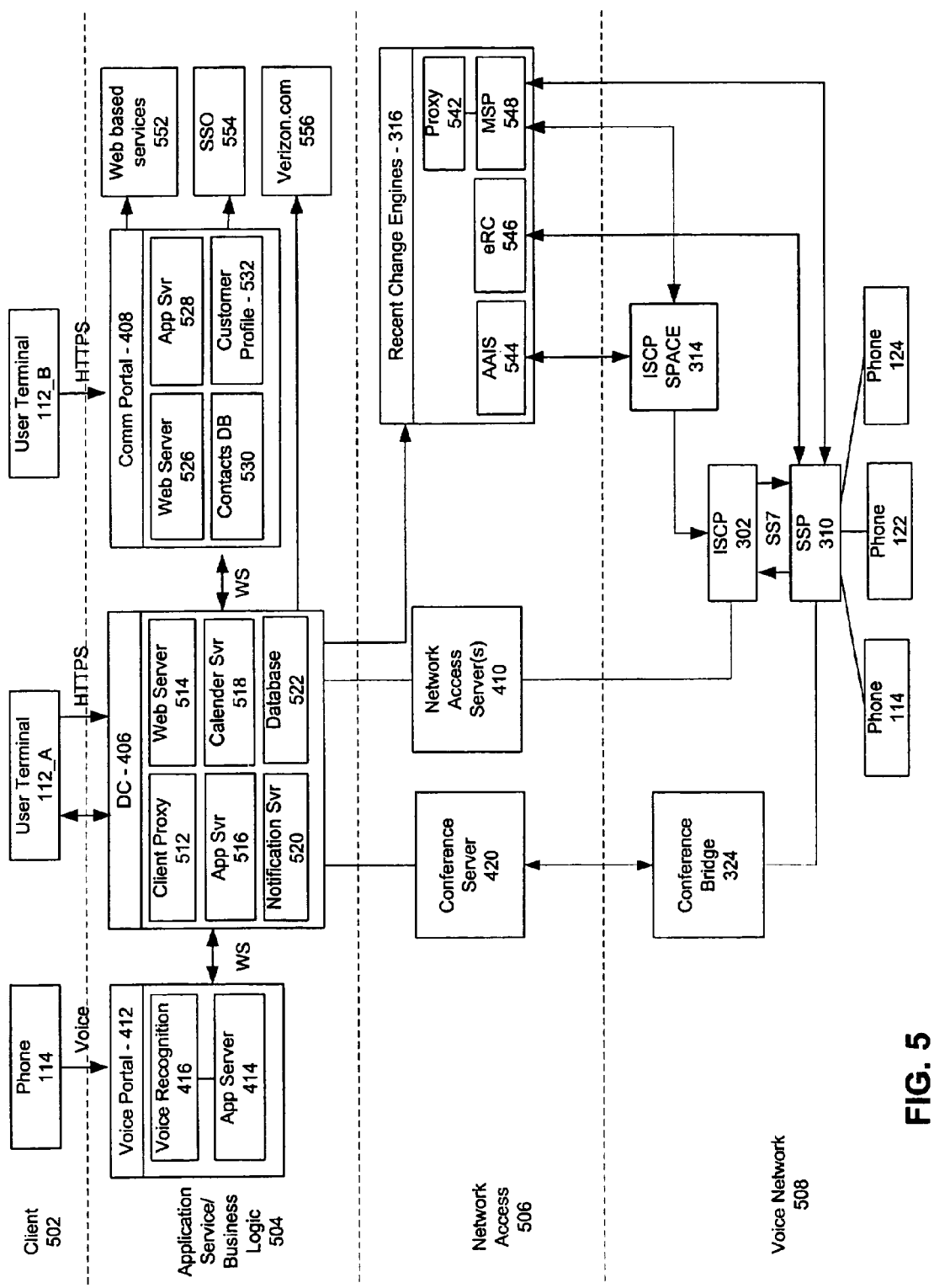
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side 502, application service 504, network access 506, and the voice network 508.

Client side 502 includes user terminals 112_A and 112_B that a user may use to send and/or receive information to/from the service center 106. Additionally, client side 502 includes the user's phone(s) 114. As discussed above, user terminals 112 may be any type of device a user may use for communicating with service center 106. For example, user terminal 112_A may be a PDA running a program for communicating with service center 106, while user terminal 112_B may be a desktop type computer running a web browser for communicating with the service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, setting up computer-enhanced conference calls, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc. In one aspect of the invention, calendar server function 518 generates and maintains a scheduling data structure, such as a user calendar that includes scheduling events (e.g., meetings, tasks, etc.), that are created by the user through user terminal 112_A. For example, a user may schedule a conference call event in a calendar application reflecting a time and date when the user is to participate in a conference call that is be established in accordance with certain aspects related to the present invention. Calendar server function 518 may operate with, or leverage, application server function 516 to initiate conference call configuration processes consistent with aspects of the invention.

Notification server function 520 provides the capability to send information from the service center 106 to a user terminal 112. For example, notification server function 520 at the direction of application server function 516 may send a notification to user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, setting up computer-enhanced conference calls, etc.

Contacts database 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 may also include a voice portal 412. As discussed above, voice portal 412 may include, for example, a voice recognition function 416 and an application server function 414, and be used for receiving and processing instructions from a customer via voice. Voice recognition function 416 may be implemented using hardware and/or software capable of providing voice recognition capabilities. This hardware and/or software may be a commercially available product, such as the Voice Application platform available from Tellme Networks, Incorporated. Application server function 414 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network access plane 506 includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in voice network 104. In one embodiment, recent change engines 316 may include an MIS 544, an eRC 546, and/or an MSP 548. Additionally, a proxy 542 may be used between digital companion servers 406 and recent change engines 316 for security purposes.

Network access servers 410 may be included in service center 106 and may provide the hardware and software for sending and receiving information to voice network 104 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network access plane 506 may also include one or more back end server(s) (not shown). These back end server(s) may include hardware and/or software for interfacing service center 106 and voice network 104. The back end server(s) may be connected to service center 106 by a network, by a direct connection, or in any other suitable manner. Further, the back end server(s) may connect to one or more devices in voice network 104 by a network, a direct connection, or in any other suitable manner.

The back end server(s) may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) may also include, for example, a directory assistance server. This directory assistance server may interface the service center 106 with a Reverse Directory Assistance Gateway (RDA Gateway) of voice network 104. An RDA Gateway is a device for issuing requests to a Data Operations Center (DOC) of voice network 104 for name and/or address information associated with a phone number and receiving the name and/or phone number in response to this request.

In another example, the back end server(s) may include a wireless internet gateway that is used for interfacing with a mobile switching center (MSC) of a wireless voice network. As with the above-described back end server(s), this wireless internet gateway may be used for converting requests and information between the formats used by service center 106 and those used by the wireless voice network.

In yet another example, the back end server(s) may include a Single Number Short Message Service (SN SMS) server for interfacing service center 106 with a Short Message Service (SMS) gateway in voice network 104. This may be used to permit the customer to have SMS messages addressed to their home phone number directed to an SMS capable device of the users choosing.

Moreover, network access plane 506 may also include a conference server 420 for instructing a conference bridge 324 in voice network 104 to dial out via an SSP to the participants of a voice conference. Alternatively, for example, conference server 420 may instruct an IP 320 of the voice network to place a call between multiple parties by dialing out to each of the parties. Conference server 420 may also include the capability to instruct conference bridge 324 or IP 320 to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

Voice network plane 508 includes the hardware and software included in voice network 104, as discussed above with reference to FIG. 3. For example, voice network plane 508 may include ISCP SPACE 314, ISCP 302, intelligent peripherals 320 (not shown), conference bridge 324, and SSP 308. Additionally, voice network plane 508 may also include the hardware and software included in a wireless carrier's network, such as, for example, the mobile switching center, etc.

System Operation

Figure 6:
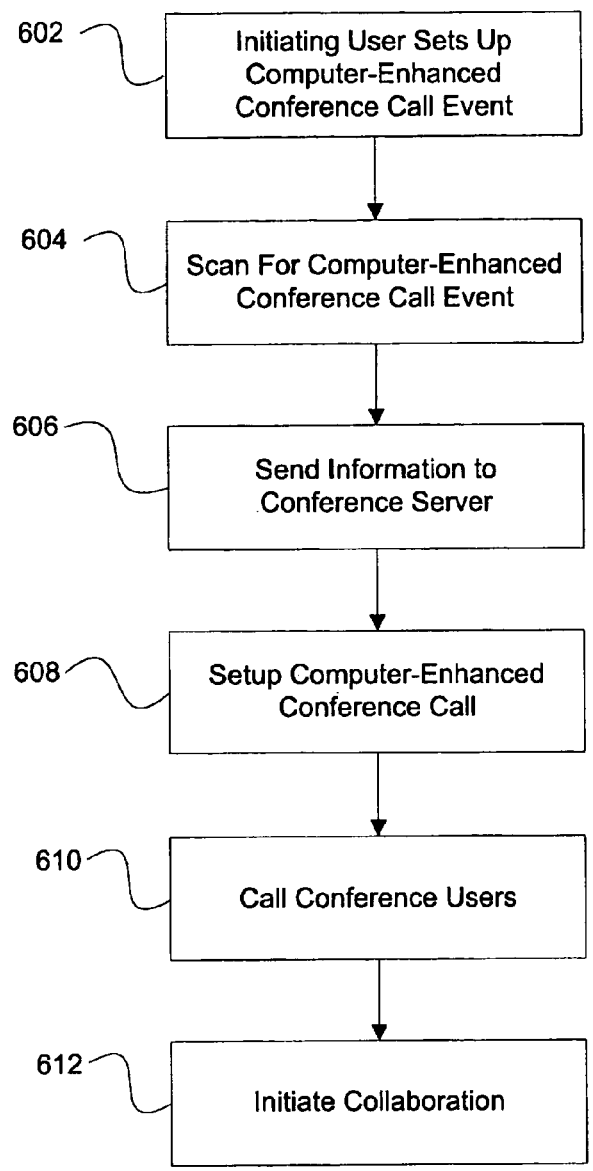
FIG. 6 is a diagram of an exemplary flowchart of a method for initiating an enhanced conference call consistent with the principles of the present invention.

FIG. 6 is a diagram of an exemplary flowchart of a method for initiating an enhanced conference call consistent with the principles of the present invention. Although the steps of the flowchart are described in a particular order, one skilled in the art will appreciate that these steps may be performed in a modified or different order. Further, one or more of the steps in FIG. 6 may be performed concurrently or in parallel.

Consistent with the present invention, a computer-enhanced conference call is a conference call between multiple users, accompanied by a collaboration between some or all of those users. Generally, collaboration may comprise multiple users (e.g., participants) sharing data interactively. For example, users participating in a collaborative session may share data in various ways, such as whiteboards, document sharing, and/or application sharing. A whiteboard is essentially an electronic chalkboard that allows users at various sites to simultaneously write and draw on an on-screen notepad viewed by multiple users (e.g., collaborate in real-time with others using graphic information). With a whiteboard, a user may review, create, and update graphic information; manipulate contents by clicking, dragging, and dropping information on the whiteboard; cut, copy, and paste information from other applications onto the whiteboard; save whiteboard contents for future reference; and otherwise edit or modify information on the whiteboard so that other users can view the changes. Document sharing may refer, for example, to the ability to allow one or more documents to be viewed, edited, saved, or replaced by multiple users participating in a collaborative session. Application sharing may refer, for example, to the ability to allow one or more applications to be viewed or otherwise controlled by multiple users participating in a collaborative session.

As illustrated in FIG. 6, a user acting as an initiating user may set up one or more computer-enhanced conference call events through a device, such as user terminal 112, and service center 106 (step 602). For example, the initiating user may access a calendar application and an address book provided by service center 106 to add conference users to a proposed conference call meeting. To do so, in one example, the initiating user may access conference user information displayed in a graphical representation of an address book corresponding to the initiating user. Using an input device (e.g., a mouse, stylus, etc.), the initiating user may select profile information for a conference user from the address book display and drop it in a conference call icon, also displayed, which is included in the calendar application for a proposed time and date (e.g., Monday, Dec. 7, 2003, 9:00 AM EST). Alternatively, the initiating user may select a date and time for a proposed computer-enhanced conference call and add conference users to a participant list provided in graphical form on the display device in user terminal 112.

Additionally, the initiating user may provide, for each conference user added to the proposed conference call, an indication as to whether or not that user should be allowed to collaborate with other users. For example, the initiating user may not wish to enable every participant to be able to share data with other participants. In such a case, the initiating user may use an input device to designate that a particular participant should not be part of any collaboration between participants. Alternatively, the default may be that a participant does not participate in a collaboration unless the initiating user designates that a particular participant should be part of any collaboration between participants.

In one aspect of the invention, service center 106 employs application server 516 to allow the initiating user to schedule a conference call to take place at a specific time and date. One skilled in the art will appreciate, however, that different mechanisms and methods may be employed to enable the initiating user to schedule a computer-enhanced conference call with one or more conference users without departing from the scope of the invention. For example, instead of scheduling a computer-enhanced conference call for a future date and time, an initiating user may indicate that the computer-enhanced conference call should occur immediately.

Periodically, application server 516 and/or calendar server 518 may scan the calendar application associated with the initiating user to determine whether a computer-enhanced conference call event is detected (step 604). The conference call event may act as a trigger that directs application server 516 to automatically set up a computer-enhanced conference call for the initiating user. For example, calendar server 518 may determine whether a current date and time matches, or is within some predetermined range of, a scheduled conference call for the initiating user. For instance, suppose an initiating user, such as user 110, previously scheduled a computer-enhanced conference call with three other users listed in user 110's address book for a particular date (e.g., Monday, Nov. 17, 2003, at 10:00 AM EST). On that date and/or time (i.e., Nov. 17, 2003), or sometime earlier, calendar server 518 may trigger a computer-enhanced conference call event that instructs application server 516 to begin configuring a computer-enhanced conference call in accordance with the particulars set up by user 110 and represented in the user's calendar. Alternatively, in the case of an immediate computer-enhanced conference call, application server 516 may detect a computer-enhanced conference call event as soon as the initiating user has submitted the required information. Such information may include, for example, identification of at least one conference user and an indication of whether the at least one conference user may participate in a collaboration.

Once a computer-enhanced conference call event is detected, application server 516 generates a computer-enhanced conference call message. The message includes profile information for each conference user included in a participant list associated with the detected scheduled computer-enhanced conference call. For example, application server 516 may collect the telephone numbers and identifiers for each conference user and add them to the message. In addition, application server 516 may also include information in the message reflective of whether different conference users should be allowed to participate in a collaboration between conference users. Once the computer-enhanced conference call message is generated, application server 516 formats the message for an appropriate transmission protocol and sends the message to conference server 420 (step 606). In one aspect of the invention, application server 516 may format the message into an XML message and transmit the message to conference server 420 using TCP/IP protocol. Other types of transmission protocols and information formats, however, may be implemented to transport the computer-enhanced conference call message to conference server 420.

Conference server 420 may extract information included in the computer-enhanced conference call message to generate a conference bridge message. A conference bridge message may be a set of commands that are directed to a specific bridge (e.g., conference bridge 324) that instructs the bridge to set up a conference call by dialing out to the users identified in the computer-enhanced conference call message. In one aspect of the invention, conference server 420 may determine which one of a plurality of bridges (not shown) is configured to handle conference call communications with any of the conference users. Conference server 420 may identify conference bridge 324 as being dedicated to handle conference call operations and thus generate a conference bridge message based on the identification of conference bridge 324. That is, conference server 420 may format a message that includes one or more commands directed to conference bridge 324. The conference bridge message may also include information reflective of whether different conference users have authorization to participate in a collaboration between conference users.

Conference bridge 324 may receive the conference bridge message and, based on the commands included in the message, may set up a conference call that includes the initiating user and any other conference users identified in the conference bridge message (step 608). In one aspect of the invention, conference bridge 324 may collect the telephone number for each conference user (including the initiating user) from the conference bridge message. Once the conference call is configured, conference bridge 324 may use the collected telephone numbers to call conference users (step 610). For example, conference bridge 324 may attempt dial out to each device (e.g., user terminals 108*a*-108*n*, 112; phones 114-124, etc.) corresponding to the collected telephone numbers using the signaling protocols and/or components implemented by voice network 104, such as SCPs, SSPs, SCPs, ISCPs, SS7 protocol infrastructures, etc.

Conference bridge 324 may also extract, from the conference bridge message, the information reflective of whether different conference users have authorization to participate in a collaboration between conference users. In one embodiment, conference bridge 324 may include an appropriate indicator of whether a specific conference user is authorized for collaboration as part of call data associated with the call from conference bridge 324 to the specific conference user.

In addition, application server 516 may initiate a collaboration from the perspective of the party initiating the computer-enhanced conference call (step 612). For example, application server 516 may launch collaboration software (e.g., WebEx, NetMeeting, etc.) from the viewpoint of the initiating user. More particularly, application server 516 may open collaboration software that is stored, for example, local to application server 516 or on a user-terminal 112 designated for use by the initiating user. Thereafter, features associated with the collaboration software that cause data to be shared may be activated. The initiating user may also select data to be shared in a collaborative session and otherwise configure the collaboration software in preparation for a collaborative session between the initiating user and the other conference users.

Figure 7:
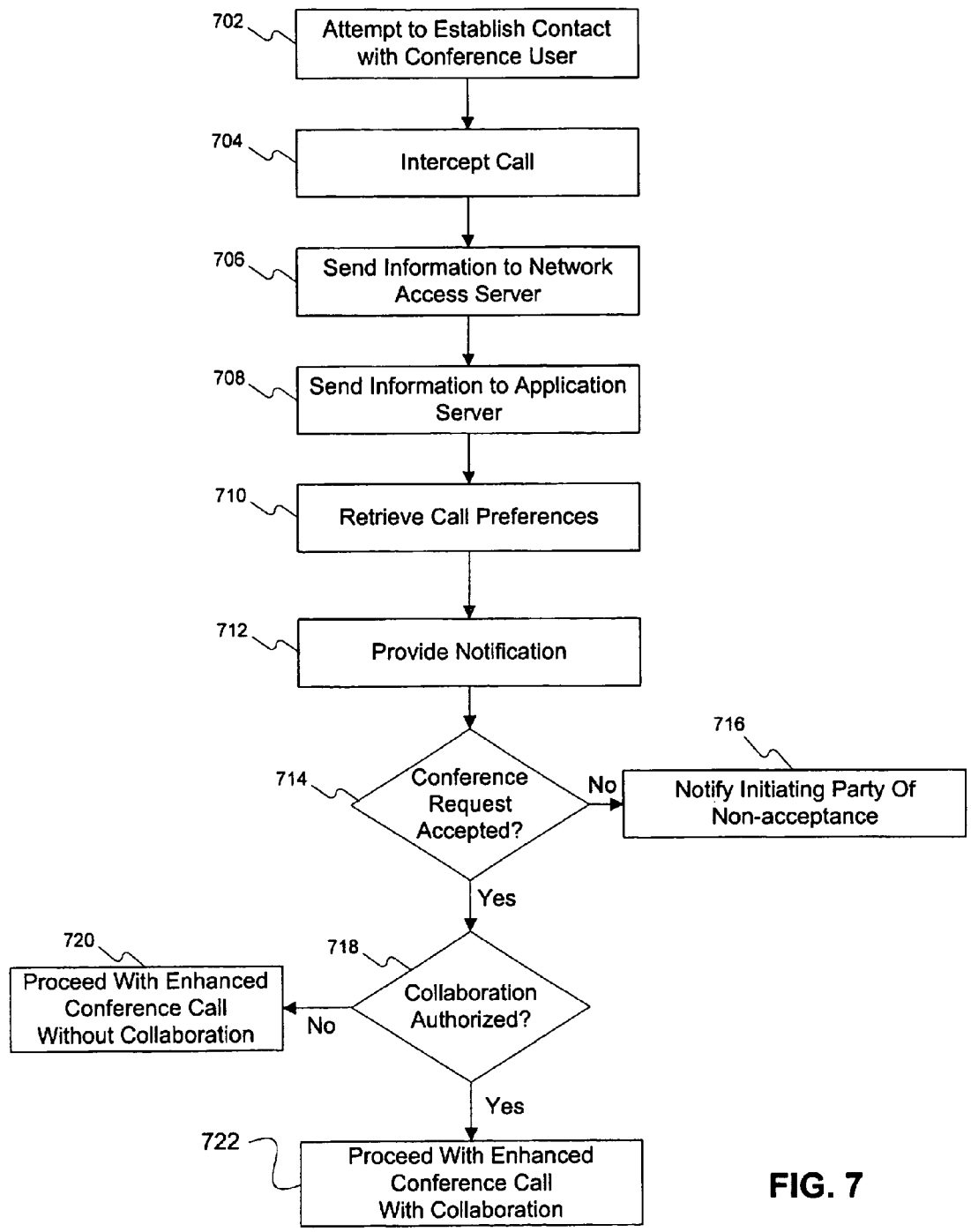
FIG. 7 is a diagram of an exemplary flowchart of a method for conducting an enhanced conference call consistent with the principles of the present invention.

Once communication is attempted to be established with a conference user, methods and systems consistent with certain aspects related to the present invention may perform a computer-enhanced conference call process. FIG. 7 is a diagram of an exemplary flowchart of a method for conducting a computer-enhanced conference call consistent with the principles of the present invention. Although the steps of the flowchart are described in a particular order, one skilled in the art will appreciate that these steps may be performed in a modified or different order. Further, one or more of the steps in FIG. 7 may be performed concurrently or in parallel.

As shown, the computer-enhanced conference call process may begin when a conference bridge, such as conference bridge 324, attempts to establish communication contact with a conference user by calling a device associated with the conference user (e.g., user terminal 108*a*, phone 120, etc.) (step 702). SSP 308 or 310 may intercept the call from conference bridge 324 (step 704). SSP 308 or 310 may intercept the call because it encountered a trigger, such as a terminating attempt trigger or a specific digit string trigger, associated with the call. For example, a trigger may be set at SSP 308 or 310 on each of the lines corresponding to a digital companion customer, that is, a user that subscribes to various services of service center 106. In this manner, a trigger is set to detect calls received at the SSP that are directed to telephone numbers of digital companion customers. In one embodiment, a conference user must be a digital companion customer in order to participate in a computer-enhanced conference call. For the purposes of this description, assume that conference users are digital companion customers.

After intercepting the call, SSP 308 or 310 sends a query to ISCP 302 requesting further instructions. In response, ISCP 302 sends call information to a network access server 410 (step 706). In one embodiment, the call information may be sent to network access server 410 via a Generic Data Interface (GDI), using a message structure associated with GDI (e.g., GetData, SendData, or InvokeApp). The call information sent to network access server 410 may also be sent in an encrypted form.

The call information may include, for example, call state data, a call intercept parameter, a voice mail parameter, time zone data, user ID, called number data, calling name data, calling number data, and calling party number (CPN) presentation information. The call information may also include an indicator that the call is part of a computer-enhanced conference call and data reflective of whether the called conference user is authorized to participate in a collaboration with other conference users. One of ordinary skill in the art will appreciate that additional information may be included with the call information, or that some of the previously noted information may be omitted-from the call information.

Call state data may provide the current call state based on processing (e.g., AIN processing) that has already occurred for the call. For example, some possible values for call state data may be indicative of a call being authorized for termination, a call being to a call intercept (CI) service node or IP, a call being from a CI service node or IP, a call being a priority call from the CI service node or IP, a call having a CI error encountered on a call to a CI service node or IP, or a call being on the first leg of a click-to-dial call.

The call intercept parameter identifies when a customer (e.g., conference user) subscribes to a call intercept feature. In one embodiment, a call intercept feature allows a customer to stop invalid numbers that typically appear as "unavailable," "private," "anonymous," or "out of area" on a caller ID display. The feature may tell callers that unidentified calls are not accepted and ask them to record a name. If an unidentified caller does not record a name or enter an override code, the called party's phone will not ring, thus eliminating interruptions from unidentified callers.

The voice mail parameter identifies when a customer has voice mail capability. Time zone data refers to the customer's time zone. Called number data refers to the number of a called device associated with the customer. User ID refers to a parameter that may have one of two values. If a distinctive ring feature is present, then user ID is set to a primary number value. If no such feature is present, then user ID is set to the same value as the called number. Distinctive ring, for example, may provide a customer with additional telephone numbers on a single line, with their own unique ringing pattern. A customer's primary number is the main number associated with the line.

Calling number data refers to the number of the caller. This parameter may contain such a number when it is available. In addition, the parameter may contain a calling party address when the information is made available by a previously executed AIN service. Otherwise, the calling number parameter may include some arbitrary string of digits or characters (e.g., ten zeros) when the caller ID information does or does not match a particular format.

Calling name data refers to the name of the calling party. This parameter may be retrieved when available, for example, by ISCP 302 from a database such as LIDB 312. It may be typically possible to retrieve the calling name when the database was populated with this data by a previously executed AIN service. If the calling name is not successfully retrieved, then the calling name parameter may include, for example, an arbitrary string of digits or characters (e.g., zeros) indicative of situations where there was no response from LIDB 312, there was an erroneous response from LIDB 312, there was no name returned from LIDB 312, the format of the caller ID is not in conformance, or the caller ID presentation is restricted.

Upon receiving the call information from ISCP 302, network access server 410 may decrypt the information, if necessary, and forward the received information to application server 516 (step 708). Application server 516 may then determine whether the conference user associated with the triggered phone number (e.g., destination/dialed phone number) is logged into the digital companion system. Application server 516 makes this determination, for example, by performing a lookup in a database, such as database 522, using the called number as an index. Based on the called number, application server 516 can determine a digital companion customer ID. This digital companion customer ID may have a number of access points (e.g., user terminals 108, 112) associated with it. Application server 516 may lookup entries in database 522 that correspond to the digital companion customer ID to determine whether the conference user is currently logged onto the system using any access points. For example, whenever a conference user is logged onto the system using an access point, an indication of such is stored in database 522. If application server 516 finds such an indication in database 522, then it knows that the conference user is logged on, and it knows which access point the conference user is using.

If the conference user is not logged on anywhere, then there is no way for service center 106 to communicate with the conference user using digital companion operations. Instead, service center 106 logs the call. When the conference user logs in at a later time, the conference user is provided with an indication that the conference user was called. Calls may be logged, for example, in database 522 or in other storage on digital companion server 406 or communication portal server 408. The call may be subsequently routed without digital companion processing. In this manner, a conference user that is not logged into the digital companion system may be able to answer a phone call from conference bridge 324 and participate in a conference call, but may not be able to participate in any collaboration between conference users. The conference user may also not be able to receive notifications consistent with the present invention.

If the conference user is logged on, then application server 516 retrieves call preference information from a database (step 710). In one embodiment, the database storing this call preference information may be database 522, customer profile database 532, or another database used to stored customer-related data. The call preference information may include, for example, call block lists, lists of forwarding devices or telephone numbers, voice mail preferences, lists of recordings that the conference user can set as pre-recorded messages, etc.

Once the various call preferences have been retrieved, application server 516 may determine one or more preferred devices for the conference user. A preferred device may be, for example, a device that the conference user previously designated for use in computer-enhanced conference calls. The preferred device may be ultimately determined by a number of factors. For example, application server 516 may be set to recognize a device indicated in the retrieved call preferences as the preferred device. The device indicated in the call preferences may be different depending on the disposition of the call. For example, a conference user may select different devices for answering calls, voice mail, screening calls, participating in computer-enhanced conference calls, etc.

In one embodiment, application server 516 may instead recognize a predetermined default device as a preferred device. A default device may be selected, for example, when a conference user neglects to explicitly specify a device as the preferred device.

In another embodiment, application server 516 may instead recognize the last device used by a conference user as the preferred device. The last device used may also be selected, for example, when a conference user neglects to explicitly specify a device as the preferred device. The conference user also may explicitly select an option that specifies the last device used as the preferred device.

Application server 516 may also receive information from calendar server 518 concerning preferred devices. For example, calendar server 518 may maintain information that indicates which device is specified as a preferred device for a conference user in a particular time period (e.g., specific times, days, months, etc.). As such, a conference user may, in advance, specify time periods during which different devices are designated as preferred devices. Whenever there is a time period in which the conference user scheduled a specific preferred device, calendar server 518 notifies application server 516 of the preferred device to be set for the conference user.

Application server 516 may also provide the collected information (e.g., call information, call preference information, and access point information) to notification server 520 and instruct notification server 520 to send a computer-enhanced conference call notification to the conference user associated with the called number (e.g., by providing an indication of the access point that the conference user is using to the notification server 520). Notification server 520 has open connections to all devices (e.g., user terminals 112) that are logged on. When notification server 520 receives information from application server 516, it uses the information to route a computer-enhanced conference call notification to the conference user at the appropriate access point (step 712). The device receiving the notification may or may not be a device designated by the conference user as the preferred device. In one embodiment, the notification may be sent using a protocol such as HTTP (Hypertext Transfer Protocol), Java, or a similar protocol.

The computer-enhanced conference call notification may present a conference user with the option of agreeing to participate in a conference call. For example, the notification may include for display a user-selectable option for accepting or declining the computer-enhanced conference call request. The notification may also identify other conference users, as well as identify which conference user initiated the computer-enhanced conference call (e.g., the initiating user). Other types of notifications may include additional information associated with the conference call, such as subject of the call, a proposed agenda, etc. Also, in the case that the conference user receiving the notification is the initiating user, the notification may provide an indication that a computer-enhanced conference call has been configured in accordance with a request by the initiating user.

If the conference user does not accept the computer-enhanced conference call request (step 714—No), then an appropriate notification may be sent to the initiating user (step 716). For example, network access server 410 may receive response information from the device of the conference user that received the computer-enhanced conference call notification. The response information may include information indicative of the conference call request denial. In response, network access server 410 may request application server 516 to instruct notification server 520 to provide the initiating user with a notification that indicates that the conference user declined the request. Options other than declining the conference call request outright (e.g., do not accept the call and hang up) may also be provided to the conference user. For example, other options may include leaving a message for the initiating user, setting an alternate telephone number to contact the conference user, and instructing conference bridge 324 to dial back in a user-specified amount of time. Further information on options for declining a conference call request may be found in U.S. patent application Ser. No. 10/720,661, which is herein incorporated by reference.

If the conference user accepts the computer-enhanced conference call request (step 714—Yes), then a determination is made as to whether the conference user is authorized to participate in a collaboration with other conference users (step 718). For example, network access server 410 may receive response information from the device of the conference user that received the computer-enhanced conference call notification. The response information may include information indicative of the conference call request acceptance. In response, network access server 410 may instruct application server 516 to examine the call information previously received in step 708, in order to determine whether the conference user has collaboration authorization.

If application server 516 determines that the conference user does not have collaboration authorization (step 718—No), then the computer-enhanced conference call may proceed without collaboration for the conference user (step 720). In this manner, the conference user may communicate with other conference users as though involved in a conference telephone call, but the conference user may not share data with other conference users (e.g., participate in a collaboration). For example, upon determining that the conference user does not have collaboration authorization, application server 516 may instruct network access server 410 to request that ISCP 302 complete the call to the conference user from conference bridge 324. More particularly, network access server 410 may request that ISCP 302 forward the call to a preferred device of the conference user on which the conference user wishes to receive conference calls specifically or phones calls generally. Alternatively, network access server 410 may request that ISCP 302 complete the call "as dialed" to a device that corresponds to the phone number provided by the initiating user.

If application server 516 determines that the conference user has collaboration authorization (step 718—Yes), the computer-enhanced conference call may proceed with collaboration for the conference user (step 722). For example, the application server 516 may initiate the collaboration from the conference user's perspective using the aforementioned collaboration software. More particularly, application server 516 may open collaboration software that is stored, for example, on the device to be used by the conference user in the collaboration, and cause the collaboration software to automatically include the conference user in the collaboration that has already been initiated from the perspective of the initiating user. In one embodiment, the device to be used by the conference user in the collaboration may have already been determined as part of the process to determine a preferred device for the conference user. Alternatively, once application server 516 has opened the collaboration software, the conference user may be prompted to provide additional input to complete the collaboration connection. This additional input may be, for example, an indication of a device to use in the collaboration, confirmation that the collaboration should proceed, or other information that may be useful in configuring the collaboration software.

In addition to the collaboration being initiated from the conference user's perspective, network access server 410 may also proceed to instruct ISCP 302 to notify conference bridge 324 to connect the conference user to the conference call in a manner consistent with the conference call connection described above in conjunction with step 720. In this manner, the conference user may communicate with other conference users using a conference telephone call and/or a collaboration.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for establishing a computer-enhanced conference call between a plurality of users, comprising:
  detecting a computer-enhanced conference call event that was configured by an initiating user to initiate a computer-enhanced conference call at a designated time, the conference call being associated with first information concerning authorization for one or more conference users to participate in a collaboration;
  initiating contact with one or more conference users associated with the computer-enhanced conference call event, including initiating a call with a first conference user at a device associated with the first conference user;
  initiating a process of connecting the call, wherein the call is intercepted before being connected to the device associated with the first conference user;
  receiving call information in response to the interception of the call;

determining a preferred device for the first conference user based on the call information;

determining whether the first conference user is authorized to participate in the collaboration, based on the first information;

providing a notification of the computer-enhanced conference call to the first conference user at the preferred device;

receiving at least one response from the one or more conference users to accept the computer-enhanced conference call;

establishing the computer-enhanced conference call between the initiating user and the accepting conference users based on the at least one received response;

establishing the collaboration to share data interactively among the initiating user and one or more of the conference users that are authorized to participate in the collaboration based on the first information concerning authorization, the data being shared interactively during the computer-enhanced conference call; and processing a request from one conference user of the one or more conference users to decline the computer-enhanced conference call by at least one of:
receiving a communication from the one conference user which declines the call and sets an alternate contact telephone number, or
receiving a communication from the one conference user which declines the call and sets a period of time in which the conference user declining the request is to be contacted again.

2. The method of claim 1, wherein detecting a computer-enhanced conference call event comprises:
scanning a data structure for the computer-enhanced conference call event.

3. The method of claim 2, wherein the data structure comprises a calendar application associated with the initiating user.

4. The method of claim 1, wherein the computer-enhanced conference call event comprises a trigger indicating a proposed computer-enhanced conference call previously scheduled by the initiating user.

5. The method of claim 4, wherein:
the proposed computer-enhanced conference call identifies the conference users; and
identifying conference users comprises:
collecting identifiers for the conference users from a first data structure corresponding to the computer-enhanced conference call event; and
collecting contact information for the conference users from a second data structure based on the conference user identifiers.

6. The method of claim 5, wherein the first data structure comprises a calendar application, and the second data structure comprises an address book listing at least the conference users and their corresponding contact information.

7. The method of claim 1, wherein initiating contact with the conference users comprises:
collecting contact information associated with the conference users; and
attempting to establish a communication connection with the conference users using the contact information.

8. The method of claim 7, wherein the contact information comprises telephone numbers associated with the conference users and attempting to establish a communication connection comprises:
dialing out to conference users using telephone numbers corresponding to the conference users.

9. The method of claim 1, wherein providing a notification of the computer-enhanced conference call to the first conference user at the preferred device comprises:
sending the notification, presenting the first conference user with an option for accepting or declining the computer enhanced conference call.

10. The method of claim 1, wherein establishing the computer-enhanced conference call comprises:
connecting calls to devices of conference users based on the at least one response received from the conference users to accept the computer-enhanced conference call.

11. The method of claim 10, wherein connecting calls comprises:
bridging calls to devices of the initiating user and conference users that accepted the computer-enhanced conference call so that the initiating user and the conference users that accepted the computer-enhanced conference call may conduct the computer-enhanced conference call; and
providing the initiating user with notification of any conference user that declined the computer-enhanced conference call.

12. The method of claim 11, wherein at least one of the calls is forwarded to a preferred device of one of the conference users.

13. The method of claim 9, wherein establishing the collaboration comprises:
launching collaboration software corresponding to the initiating user and authorized conference users so that the initiating users and authorized conference users may participate in the collaboration.

14. The method of claim 1, wherein determining a preferred device comprises:
retrieving call preference information corresponding to the first conference user based on the call information; and
selecting the preferred device for the first conference user based on the retrieved call preference information.

15. The method of claim 1, comprising receiving a designation, from at least one of the conference users, of a preferred device to participate in the collaboration.

16. A method for establishing a computer-enhanced conference call between a plurality of users, comprising:
detecting a computer-enhanced conference call event that was configured by an initiating user to initiate a computer-enhanced conference call at a designated time, the conference call being associated with first information concerning authorization for one or more conference users to participate in a collaboration;
initiating contact with one or more conference users associated with the computer-enhanced conference call event, including initiating a call with a first conference user at a device associated with the first conference user;
initiating a process of connecting the call, wherein the call is intercepted before being connected to the device associated with the first conference user;
receiving call information in response to the interception of the call;
determining a preferred device for the first conference user based on the call information and calendar information, the calendar information identifying a first device and a second device associated with the first conference user, the calendar information reflecting that the first device is preferred by the first conference user for sharing data interactively in computer-enhanced conference calls during a first time period and the second device is preferred for sharing data interactively in computer-enhanced conference calls during a second time period;

determining whether the first conference user is authorized to participate in the collaboration, based on the first information;

bridging calls to devices of the initiating user and the conference users to establish a computer-enhanced conference call between the initiating user and the conference users, wherein at least one of the calls is forwarded to the first conference user at the preferred device;

establishing the collaboration to share the data interactively among the initiating user and a subset of the conference users that are authorized to participate in the collaboration, the subset being based on the first information, the data being shared interactively by the first conference user during the computer-enhanced conference call;

sending notifications of a computer-enhanced conference call request to the conference users; and processing a request from one conference user of the one or more conference users to decline the computer-enhanced conference call request by at least one of:
  receiving a communication from the one conference user which declines the request and records a message for subsequent play back to the initiating user, or
  receiving a communication from the one conference user which declines the request and sets a period of time in which the conference user declining the request is to be contacted again.

17. The method of claim 16, wherein detecting a computer-enhanced conference call event comprises;
  scanning a data structure for the computer-enhanced conference call event.

18. The method of claim 17, wherein the data structure comprises a calendar application associated with the initiating user.

19. The method of claim 16, wherein the computer-enhanced conference call event comprises a trigger indicating a proposed computer-enhanced conference call previously scheduled by the initiating user.

20. The method of claim 19, wherein:
  the proposed computer-enhanced conference call identifies the conference users; and
  identifying conference users includes:
    collecting identifiers for the conference users from a first data structure corresponding to the computer-enhanced conference call event; and
    collecting contact information for the conference users from a second data structure based on the conference user identifiers.

21. The method of claim 20, wherein the first data structure comprises a calendar application, and the second data structure comprises an address book listing at least the conference users and their corresponding contact information.

22. The method of claim 16, wherein initiating contact with the conference users comprises:
  collecting contact information associated with the conference users; and
  attempting to establish a communication connection with the conference users using the contact information.

23. The method of claim 22, wherein the contact information comprises telephone numbers associated with the conference users and attempting to establish a communication connection comprises:
  dialing out to conference users using telephone numbers corresponding to the conference users.

24. The method of claim 16, wherein establishing the collaboration comprises:
  launching collaboration software corresponding to the initiating user and authorized conference users so that the initiating users and authorized conference users may participate in the collaboration.

25. The method of claim 16, wherein the sending comprises;
  retrieving data corresponding to the conference users;
  selecting devices associated with the conference users to receive the notification based on the retrieved data; and
  providing the notification to the selected devices for display on the selected devices.

26. The method of claim 16, comprising receiving a designation, from at least one of the conference users, of a preferred device to participate in the collaboration.

27. A method for establishing a computer-enhanced conference call, comprising:
  receiving information pertaining to a computer-enhanced conference call between a plurality of conference users, including an initiating user, that was setup by the initiating user, comprising first information concerning authorization for one or more conference users to participate in a collaboration;
  initiating a process of connecting a call with the plurality of conference users at a device associated with each of the plurality of conference users, wherein the call is intercepted before being connected to the device associated with each of the plurality of conference users;
  receiving call information for each of the plurality of conference users in response to the interception of the call;
  determining a preferred device for each of the plurality of conference users based on the call information;
  determining whether each of the plurality of conference users is authorized to participate in the collaboration, based on the first information;
  sending a notification of a computer-enhanced conference call request to the preferred device associated with one of the plurality of conference users;
  receiving a response to the notification;
  establishing a computer-enhanced conference call between the initiating user and the conference users based on the response;
  establishing the collaboration between the initiating user and one or more of the conference users that are authorized to participate in the collaboration based on the first information concerning authorization, the collaboration excluding at least one conference user that is not authorized to participate in the collaboration but participates in the computer-enhanced conference call; and
  processing a request from one conference user of the one or more conference users to decline the computer-enhanced conference call by at least one of:
    receiving a communication from the one conference user which declines the call and sets an alternate contact telephone number, or
    receiving a communication from the one conference user which declines the call and sets a period of time in which the conference user declining the request is to be contacted again.

28. An apparatus for establishing a computer-enhanced conference call between a plurality of users, including an initiating user, comprising:
  means for detecting a computer-enhanced conference call event that was configured by the initiating user to initiate a computer-enhanced conference call at a designated time, the conference call associated with information concerning authorization for one or more conference users to participate in a collaboration;

means for initiating contact with conference users associated with the computer-enhanced conference call event, including initiating a call with a first conference user at a device associated with the first conference user;

means for initiating a process of connecting the call, wherein the call is intercepted before being connected to the device associated with the first conference user;

means for receiving call information in response to the interception of the call;

means for determining a preferred device for the first conference user based on the call information;

means for determining whether the first conference user is authorized to participate in the collaboration, based on the first information;

means for providing a notification of the computer-enhanced conference call to the first conference user at the preferred device;

means for receiving at least one response from the conference users to accept the computer-enhanced conference call;

means for establishing the computer-enhanced conference call between the initiating user and the conference users based on the at least one received response;

means for establishing the collaboration to share data interactively among the initiating user and one or more of the conference users that are authorized to participate in the collaboration based on the first information, the data being shared interactively during the computer-enhanced conference call;

wherein the means for connecting calls comprises means for providing the initiating user with notification of any conference user that declined the computer-enhanced conference call; and wherein the means for connecting calls allows users to decline the call, by performing at least one of:
setting an alternate contact telephone number; or
setting a period of time in which the conference user declining the call is to be contacted again.

29. The apparatus of claim 28, wherein the means for detecting a computer-enhanced conference call event comprises:
means for scanning a data structure for the computer-enhanced conference call event.

30. The apparatus of claim 29, wherein the data structure comprises a calendar application associated with the initiating user.

31. The apparatus of claim 28, wherein the computer-enhanced conference call event comprises a trigger indicating a proposed computer-enhanced conference call previously scheduled by the initiating user.

32. The apparatus of claim 31, wherein the proposed computer-enhanced conference call identifies the conference users and the means for detecting a computer-enhanced conference call event comprises:
means for collecting identifiers for the conference users from a first data structure corresponding to the computer-enhanced conference call event; and
means for collecting contact information for the conference users from a second data structure based on the conference user identifiers.

33. The apparatus of claim 32, wherein the first data structure comprises a calendar application and the second data structure comprises an address book listing at least the conference users and their corresponding contact information.

34. The apparatus of claim 28, wherein the means for initiating contact with the conference users comprises:

means for collecting contact information associated with the conference users; and
means for attempting to establish a communication connection with the conference users using the contact information.

35. The apparatus of claim 34, wherein the contact information comprises telephone numbers associated with the conference users and the means for initiating a process of connecting the call comprises:
means for dialing out to conference users using telephone numbers corresponding to the conference users.

36. The apparatus of claim 28, wherein the means for providing a notification of the computer-enhanced conference call to the first conference user at the preferred device comprises:
means for sending the notification, wherein the notification presents the first conference user with an option for accepting or declining the computer enhanced conference call.

37. The apparatus of claim 28, wherein the means for establishing the computer-enhanced conference call comprises:
means for connecting calls to devices of conference users based on the at least one response received from the conference users to accept the computer-enhanced conference call.

38. The apparatus of claim 37, wherein the means for connecting calls comprises:
means for bridging calls to devices of the initiating user and conference users that accepted the computer-enhanced conference call so that the initiating user and the conference users that accepted the computer-enhanced conference call may conduct the computer-enhanced conference call.

39. The apparatus of claim 38, wherein at least one of the calls is forwarded to a preferred device of one of the conference users.

40. The apparatus of claim 36, wherein the means for establishing the collaboration comprises:
means for launching collaboration software corresponding to the initiating user and authorized conference users so that the initiating users and authorized conference users may participate in the collaboration.

41. The apparatus of claim 28, wherein the means for determining a preferred device comprises:
means for retrieving call preference information corresponding to the first conference user based on the call information; and
means for selecting a preferred device for the first conference user based on the retrieved call preference information.

42. The apparatus of claim 28, comprising means for receiving a designation, from at least one of the conference users, of a preferred device to participate in the collaboration.

43. An apparatus for establishing a computer-enhanced conference call between a plurality of users, comprising:
means for detecting a computer-enhanced conference call event that was configured by an initiating user to initiate a computer-enhanced conference call at a designated time, the conference call being associated with first information concerning authorization for one or more conference users to participate in a collaboration;
means for initiating contact with conference users associated with the computer-enhanced conference call event, including initiating a call with a first conference user at a device associated with the first conference user;

means for initiating a process of connecting the call, wherein the call is intercepted before being connected to the device associated with the first conference user;

means for receiving call information in response to the interception of the call;

means for determining a preferred device for the first conference user based on the call information and calendar information, the calendar information identifying a first device and a second device associated with the first conference user, the calendar information reflecting that the first device is preferred by the first conference user for sharing data interactively in computer-enhanced conference calls during a first time period and the second device is preferred for sharing data interactively in computer-enhanced conference calls during a second time period;

means for determining whether the first conference user is authorized to participate in the collaboration, based on the first information;

means for bridging calls to devices of the initiating user and the conference users to establish a computer-enhanced conference call between the initiating user and the conference users, wherein at least one of he calls is forwarded to the first conference user at the preferred device;

means for establishing the collaboration to share the data interactively among the initiating user and one or more of the conference users that are authorized to participate in the collaboration based on the first information concerning authorization, the data being shared interactively by the first user during the computer-enhanced conference call; and means for sending notifications of a computer-enhanced conference call request to the conference users, the conference users able to decline the call by at least one of:

receiving a communication from the conference user which declines the request, and recording a message for subsequent play back to the initiating user, or receiving a communication from the conference user which declines the request, and setting a period of time in which the conference user declining the request is to be contacted again.

44. The apparatus of claim 43, wherein the means for detecting a computer-enhanced conference call event comprises:

means for scanning a data structure for the computer-enhanced conference call event.

45. The apparatus of claim 44, wherein the data structure comprises a calendar application associated with the initiating user.

46. The apparatus of claim 43, wherein the computer-enhanced conference call event comprises a trigger indicating a proposed computer-enhanced conference call previously scheduled by the initiating user.

47. The apparatus of claim 46, wherein the proposed computer-enhanced conference call identifies the conference users and means for detecting a computer-enhanced conference call event includes:

means for collecting identifiers for the conference users from a first data structure corresponding to the computer-enhanced conference call event; and means for collecting contact information for the conference users from a second data structure based on the conference user identifiers.

48. The apparatus of claim 47, wherein the first data structure comprises a calendar application and the second data structure comprises an address book listing at least the conference users and their corresponding contact information.

49. The apparatus of claim 43, wherein the means for initiating contact with the conference users comprises:

means for collecting contact information associated with the conference users; and means for attempting to establish a communication connection with the conference users using the contact information.

50. The apparatus of claim 49, wherein the contact information comprises telephone numbers associated with the conference users and the means for attempting to establish a communication connection comprises:

means for dialing out to conference users using telephone numbers corresponding to the conference users.

51. The apparatus of claim 43, wherein the means for establishing the collaboration comprises:

means for launching collaboration software corresponding to the initiating user and authorized conference users so that the initiating users and authorized conference users may participate in the collaboration.

52. The apparatus of claim 43, wherein the means for sending comprises:

means for retrieving data corresponding to the conference users;

means for selecting devices associated with the conference users to receive the notification based on the retrieved data; and means for providing the notification to the selected devices for display on the selected devices.

53. The apparatus of claim 43, comprising means for receiving a designation, from at least one of the conference users, of a preferred device to participate in the collaboration.

54. An apparatus for establishing a computer-enhanced conference call, comprising:

means for receiving information pertaining to a computer-enhanced conference call between a plurality of conference users, including an initiating user, that was setup by the initiating user, comprising first information concerning authorization for one or more conference users to participate in a collaboration;

means for initiating a process of connecting a call with the plurality of conference users at a device associated with each of the plurality of conference users, wherein the call is intercepted before being connected to the device associated with each of the plurality of conference users;

means for receiving call information for each of the plurality of conference users in response to the interception of the call;

means for determining a preferred device for each of the plurality of conference users based on the call information;

means for determining whether each of the plurality of conference users is authorized to participate in the collaboration, based on the first information;

means for sending a notification of a computer-enhanced conference call request to the preferred device associated with one of the plurality of conference users;

means for receiving a response to the notification;

means for establishing a computer-enhanced conference call between the initiating user and conference users based on the response;

means for establishing the collaboration between the initiating user and one or more of the conference users that are authorized to participate in the collaboration based on the first information concerning authorization, the collaboration excluding at least one conference user that is not authorized to participate in the collaboration but participates in the computer-enhanced conference call; and means for sending notifications of a computer-enhanced conference call request to the conference users, the conference users able to decline the computer-enhanced conference call by at least one of:
  receiving a communication from the conference user which declines the call, and setting an alternate contact telephone number, or
  receiving a communication from the conference user which declines the call, and setting a period of time in which the conference user declining the request is to be contacted again.

55. A non-transitory computer-readable medium encoded with instructions which, when executed by a computer, perform a method for establishing a computer-enhanced conference call between a plurality of users, the method comprising:
  detecting a computer-enhanced conference call event that was configured by an initiating user to initiate a computer-enhanced conference call at a designated time, the conference call being associated with first information concerning authorization for one or more conference users to participate in a collaboration;
  initiating contact with conference users associated with the computer-enhanced conference call event, including initiating a call with the first conference user at a device associated with the first conference user;
  initiating a process of connecting the call, wherein the call is intercepted before being connected to the device associated with the first conference user;
  receiving call information in response to the interception of the call;
  determining a preferred device for the first conference user based on the call information;
  determining whether the first conference user is authorized to participate in the collaboration, based on the first information;
  providing a notification of the computer-enhanced conference call to the first conference user at the preferred device;
  receiving at least one response from the conference users to accept the computer-enhanced conference call;
  establishing the computer-enhanced conference call between the initiating user and the accepting conference users based on the at least one received response;
  establishing the collaboration to share second data interactively among the initiating user and one or more of the conference users that are authorized to participate in the collaboration based on the first information, and the second data being shared interactively during the computer-enhanced conference call; and
  processing a request from one conference user of the one or more conference users to decline the computer-enhanced conference call by at least one of:
    receiving a communication from the one conference user which declines the call and sets an alternate contact telephone number, or
    receiving a communication from the one conference user which declines the call and sets a period of time in which the conference user declining the request is to be contacted again.

56. A non-transitory computer-readable medium encoded with instructions which, when executed by a computer, perform a method for establishing a computer-enhanced conference call between a plurality of users, the method comprising:
  detecting a computer-enhanced conference call event that was configured by an initiating user to initiate a computer-enhanced conference call at a designated time, the conference call being associated with first information concerning authorization for one or more conference users to participate in a collaboration;
  initiating contact with conference users associated with the computer-enhanced conference call event, including initiating a call with a first conference user at a device associated with the first conference user;
  initiating a process of connecting the call, wherein the call is intercepted before being connected to the device associated with the first conference user;
  receiving call information in response to the interception of the call;
  determining a preferred device for the first conference user based on the call information and calendar information, the calendar information identifying a first device and a second device associated with a first conference user, the calendar information reflecting that the first device is preferred by the first conference user for sharing data interactively in computer-enhanced conference calls during a first time period and the second device is preferred for sharing data interactively in computer-enhanced conference calls during a second time period;
  determining whether the first conference user is authorized to participate in the collaboration, based on the first information;
  bridging calls to devices of the initiating user and the conference users to establish a computer-enhanced conference call between the initiating user and the conference users, wherein at least one of the calls is forwarded to the first conference user at the preferred device based on the determination that the computer-enhanced conference call falls within the first time period;
  establishing the collaboration to share the data interactively among the initiating user and one or more of the conference users that are authorized to participate in the collaboration based on the first information, the data being shared interactively by the first conference user during the computer-enhanced conference call; and
  processing a request from one conference user of the one or more conference users declining the computer-enhanced conference call by at least one of:
    receiving a communication from the one conference user which declines the call and records a message for subsequent play back to the initiating user, or
    receiving a communication from the one conference user which declines the call and sets a period of time in which the conference user declining the request is to be contacted again.

57. A non-transitory computer-readable medium encoded with instructions which, when executed by a computer, perform a method for establishing a computer-enhanced conference call, the method comprising:
  receiving information pertaining to a computer-enhanced conference call between a plurality of conference users, including an initiating user, that was setup by the initiating user, comprising first information about one or more conference users authorized to participate in a collaboration;
  initiating a process of connecting a call with the plurality of conference users at a device associated with each of the plurality of conference users, wherein the call is intercepted before being connected to the device associated with each of the plurality of conference users;

receiving call information for each of the plurality of conference users in response to the interception of the call;

determining a preferred device for each of the plurality of conference users based on the call information;

determining whether each of the plurality of conference users is authorized to participate in the collaboration, based on the first information;

sending a notification of a computer-enhanced conference call request to the preferred device associated with one of the plurality of conference users;

receiving a response to the notification;

establishing a computer-enhanced conference call between the initiating user and the plurality of conference users based on the response;

establishing the collaboration between the initiating user and one or more of the conference users that are authorized to participate in the collaboration based on the response based on the first information concerning authorization, the collaboration excluding at least one conference user that is not authorized to participate in the collaboration but participates in the computer-enhanced conference call; and processing a request from one conference user of the one or more conference users to decline the computer-enhanced conference call by at least one of:

receiving a communication from the one conference user which declines the call and sets an alternate contact telephone number, or receiving a communication from the one conference user which declines the call and sets a period of time in which the conference user declining the request is to be contacted again.

58. An apparatus for establishing a computer-enhanced conference call between a plurality of users, comprising:

a first server operable to detect a computer-enhanced conference call event that was configured by an initiating user to initiate a computer-enhanced conference call at a designated time, the conference call being associated with first information concerning authorization for one or more conference users to participate in a collaboration;

a second server operable to initiate contact with conference users associated with the computer-enhanced conference call event, including initiating a call with a first conference user at a device associated with the first conference user;

a third server operable to initiate a process of connect the call, wherein the call is intercepted before being connected to the device associated with the first conference user;

a fourth server operable to receive call information in response to the interception of the call; and a conference bridge operable to bridge calls to devices of the initiating user and the conference users based on responses from the conference users, wherein:

a collaboration is established to share data interactively among the initiating user and one or more of the conference users that are authorized to participate in the collaboration based on the first information concerning authorization, and;

one of the calls is bridged to the first conference user at a preferred device for the first conference user;

the preferred device for the first conference user is determined based on the call information and calendar information, the calendar information reflecting that the computer-enhanced conference call occurs during a time period when the first conference user prefers to use the preferred device to share the data interactively during the computer-enhanced conference call;

a determination of whether the first conference user is authorized to participate in the collaboration is made based on the first information; and processing a request from one conference user of the one or more conference users to decline the computer-enhanced conference call is done by at least one of:

receiving a communication from the on conference user which declines the call and records a message for subsequent play back to the initiating user, or receiving a communication from the one conference user which declines the call and sets a period of time in which the conference user declining the request is to be contacted again.

59. A method for establishing a computer-enhanced conference call between a plurality of users, comprising:

detecting a computer-enhanced conference call event set up by an initiating user, the conference call being associated with first information concerning authorization for one or more conference users to participate in a collaboration;

initiating a process of connecting a call with conference users at a device associated with each of the conference users, wherein the call is intercepted before being connected to the device associated with each of the conference users;

receiving call information for each of the conference users in response to the interception of the call;

determining a preferred device for each of the conference users based on the call information;

determining whether each of the conference users is authorized to participate in the collaboration, based on the first information;

sending a notification of a computer-enhanced conference call request to the preferred device associated with one of the conference users;

receiving at least one response from the conference users;

establishing a computer-enhanced conference call between the initiating user and the conference users based on the at least one received response;

establishing the collaboration between the initiating user and one or more of the conference users that are authorized to participate in the collaboration based on the first information, and the collaboration excluding at least one conference user that is not authorized to participate in the collaboration but participates in the computer-enhanced conference call; and processing a conference user declining the computer-enhanced conference call by at least one of:

receiving a communication from the conference user which declines the call and sets an alternate contact telephone number, or receiving a communication from the conference user which declines the call and sets a period of time in which the conference user declining the request is to be contacted again.

60. A method for establishing a computer-enhanced conference call between a plurality of users, comprising:

detecting a computer-enhanced conference call event set up by an initiating user, the conference call being associated with first information concerning authorization for one or more conference users to participate in a collaboration;

initiating a process of connecting a call with conference users at a device associated with each of the conference users, wherein the call is intercepted before being connected to the device associated with each of the plurality of conference users;
receiving call information for each of the conference users in response to the interception of the call;
determining a preferred device for each of the conference users based on the call information;
determining whether each of the conference user is authorized to participate in the collaboration, based on the first information;
sending a notification of a computer-enhanced conference call request to the preferred device associated with one of the conference users;
receiving at least one response from the conference users;
bridging calls to devices of the initiating user and the conference users;
establishing the collaboration between the initiating user and one or more of the conference users that are authorized to participate in the collaboration based on the first information, the collaboration excluding at least one unauthorized conference user that is not authorized to participate in the collaboration but participates in the computer-enhanced conference call; and
processing a conference user declining the computer-enhanced conference call by at least one of:
receiving a communication from the conference user which declines the call and sets an alternate contact telephone number, or
receiving a communication from the conference user which declines the call and sets a period of time in which the conference user declining the request is to be contacted again.

61. The method of claim 1, wherein the first information is provided by the initiating user in advance of detecting the computer-enhanced conference call event.

62. The method of claim 1, wherein determining that the first conference user is authorized to participate in the collaboration comprises determining that information associated with the first conference user does not appear in the first information.

63. The method of claim 1, wherein determining the preferred device for the first conference user is based on whether the first conference user is authorized to participate in the collaboration.

* * * * *